(12) United States Patent
Du et al.

(10) Patent No.: US 12,026,573 B2
(45) Date of Patent: Jul. 2, 2024

(54) METHOD FOR SWITCHING SCANNER BUTTONS, APPARATUS, STORAGE MEDIUM, AND SCANNER

(71) Applicants: GREE ELECTRIC APPLIANCES (WUHAN) CO., LTD, Wuhan (CN); GREE ELECTRIC APPLIANCES, INC. OF ZHUHAI, Zhuhai (CN); ZHUHAI LEAYUN TECHNOLOGY CO., LTD, Zhuhai (CN)

(72) Inventors: Kangzhuang Du, Zhuhai (CN); Yanyu Chen, Zhuhai (CN); Yaqi Ma, Zhuhai (CN); Pengfei Zhu, Zhuhai (CN); Haisheng Lin, Zhuhai (CN); Ruirui Wang, Zhuhai (CN)

(73) Assignees: GREE ELECTRIC APPLIANCES (WUHAN) CO., LTD, Hubei (CN); GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 9 days.

(21) Appl. No.: 18/004,297

(22) PCT Filed: May 12, 2021

(86) PCT No.: PCT/CN2021/093287
§ 371 (c)(1),
(2) Date: Jan. 4, 2023

(87) PCT Pub. No.: WO2022/057284
PCT Pub. Date: Mar. 24, 2022

(65) Prior Publication Data
US 2023/0222300 A1    Jul. 13, 2023

(30) Foreign Application Priority Data

Sep. 15, 2020  (CN) .......................... 202010968385.6

(51) Int. Cl.
*G06K 7/10* (2006.01)
*G06K 7/14* (2006.01)

(52) U.S. Cl.
CPC ..... *G06K 7/10198* (2013.01); *G06K 7/10891* (2013.01); *G06K 7/1413* (2013.01)

(58) Field of Classification Search
CPC .......... G06K 7/10198; G06K 7/10891; G06K 7/1413; G06K 7/10881; G06K 7/1091; G06K 7/01396
See application file for complete search history.

(56) References Cited

FOREIGN PATENT DOCUMENTS

| CN | 104217472 A | 12/2014 | |
|----|-------------|---------|--|
| CN | 109740392 A | 5/2019 | |
| EP | 2579181 A1 * | 4/2013 | ......... G06K 7/10554 |

OTHER PUBLICATIONS

International Search Report for corresponding International App. No. PCT/CN2021/093287, mailed Aug. 18, 2021, 2 pages.

* cited by examiner

*Primary Examiner* — Matthew Mikels
(74) *Attorney, Agent, or Firm* — Armstrong Teasdale LLP

(57) ABSTRACT

The present disclosure provides a method for switching scanner buttons, an apparatus, a storage medium, and a scanner. The method comprises: scanning a barcode and obtaining barcode data; determining whether the barcode data matches preset button switching barcode data; in a case that the barcode data matches the button switching barcode data, switching an active button bit for waking up a scanner from a button at the current side to a button at the other side.

20 Claims, 2 Drawing Sheets

METHOD FOR SWITCHING SCANNER BUTTONS, APPARATUS, STORAGE MEDIUM, AND SCANNER

CROSS-REFERENCE TO RELATED APPLICATION

The present application is a National Stage entry of International Patent App. No. PCT/CN2021/093287, filed on May 12, 2021, which claims priority to Chinese Patent Application No. 202010968385.6, filed to the China National Intellectual Property Administration on Sep. 15, 2020 and entitled "Method for Switching Scanner Buttons, Apparatus, Storage Medium, and Scanner", the disclosure of which are hereby incorporated by reference in their entirety.

TECHNICAL FIELD

The present disclosure relates to the technical field of scanners, in particular, to a scanner button method for switching scanner buttons, an apparatus, a storage medium, and a scanner.

BACKGROUND

As a scientific and technological product that is tightly combined with technologies such as optics, mechanics, electronics and software applications, a barcode scanner is an important computer input device, which is widely applied to the fields of supermarkets, counters, warehouses and logistics. The barcode scanner is classified into a wired scanner and a wireless scanner. Since the wireless scanner is powered by a battery, an endurance problem is required to be taken into consideration, so that the scanner is in a dormant state to reduce power consumption during work intervals, and may be continuously used by waking up in dormancy. The wireless scanner is generally woken up by using a button, and the button is a physical button or a touch button.

For a ring-type scanner in the wireless scanner, the design of the current button of the ring-type scanner has the following defects.

1. The button is only disposed on one side. The ring-type scanner is only suitable for a left hand or a right hand, which is inconvenient to change hands, so that the button has a narrow application range.

2. The button is only disposed on one side. A scanning head of the scanner is designed to be rotary, so as to meet a use requirement for both hands. However, the rotary structure may cause the increase of the volume of the entire structure of the scanning head, so that it is inconvenient to wear, and the protection performance of the scanner is reduced.

3. The buttons are disposed on both sides. The ring-type scanner is suitable for both left and right hands. However, since the buttons are disposed on both sides and are active, so that the buttons are easily touched by other fingers by mistake after wearing.

SUMMARY

The present disclosure provides a method for switching scanner buttons, an apparatus, a storage medium, and a scanner.

According to a first aspect, the present disclosure provides a method for switching scanner buttons, buttons are disposed on both left and right sides of a scanner, the method includes:

a barcode is scanned and barcode data is obtained;

whether the barcode data matches preset button switching barcode data is determined;

in a case that the barcode data matches the button switching barcode data, an active button bit for waking up the scanner is switched from a button at the current side to a button at the other side.

According to a second aspect, the present disclosure provides an apparatus for switching scanner buttons, includes:

A scanning component, configured to scan a barcode and obtain barcode data.

A control component, configured to, in a case that the barcode data obtained by the scanning component matches preset button switching barcode data, switch an active button bit for waking up a scanner from a button at the current side to a button at the other side.

According to a third aspect, the present disclosure provides a storage medium. The storage medium stores a computer program. When the computer program is executed by a processor, the above scanner button switching method is implemented.

According to a fourth aspect, the present disclosure provides a scanner, includes:

The memory, configured to store a computer program.

The processor, configured to execute the computer program in the memory, so as to implement the above scanner button switching method.

The above technical features may be combined in various suitable manners or replaced by equivalent technical features, as long as the purpose of the present disclosure can be achieved.

BRIEF DESCRIPTION OF THE DRAWINGS

The present disclosure is described in more detail below on the basis of embodiments and with reference to the drawings.

Figure 1:
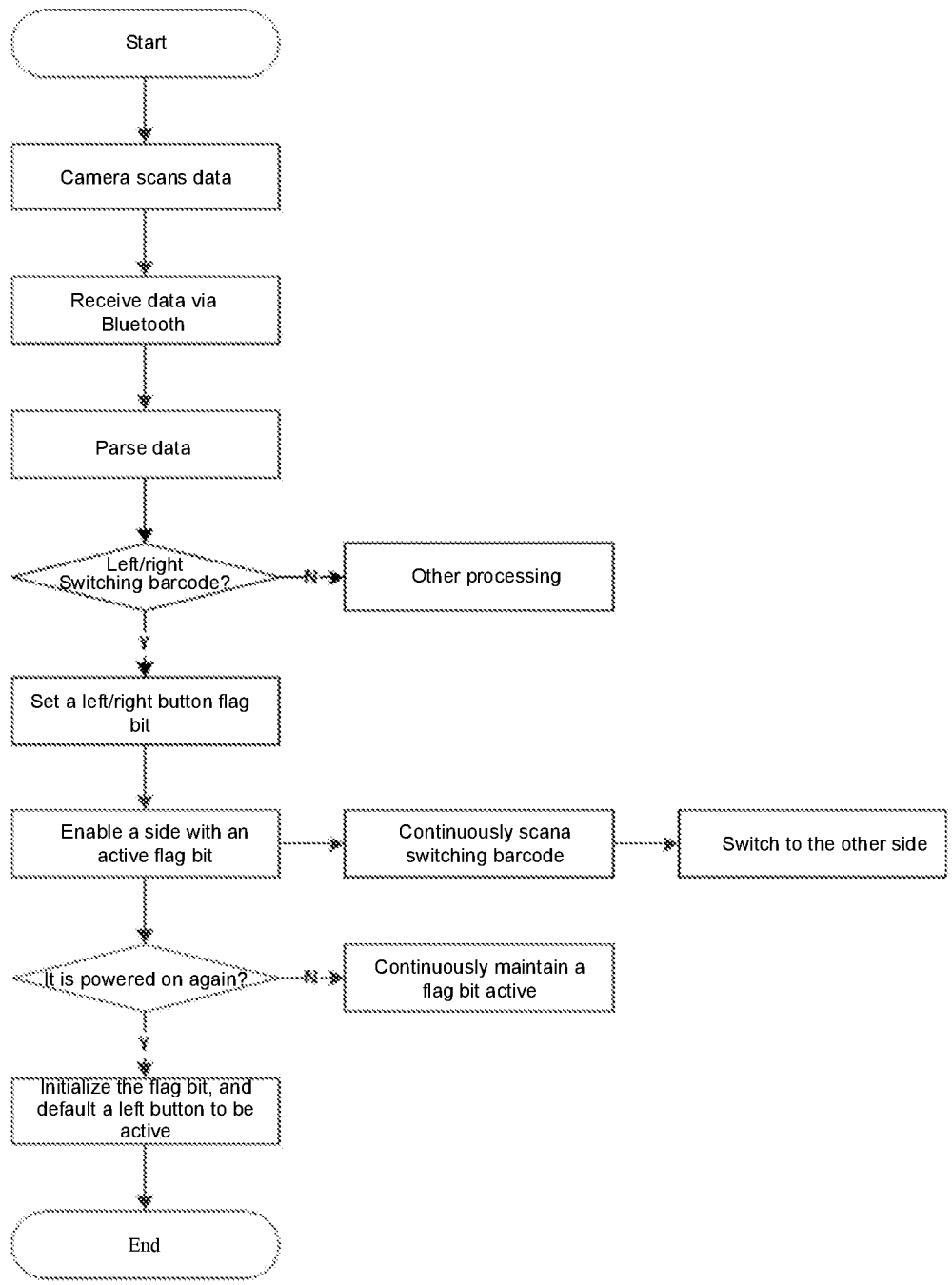
FIG. 1 is a flowchart of a switching method according to the present disclosure.

In the drawings, same components use the same drawing signs. The drawings do not follow the actual scale.

DETAILED DESCRIPTION OF THE EMBODIMENTS

The present disclosure is further described below with reference to the drawings.

In order to be suitable for the left and right hands at the same time, buttons are disposed on both left and right sides of a conventional ring-type scanner, and the buttons on both sides have the same function. During an actual application, the ring-type scanner is worn on the index finger. The thumb of the same hand operates the button close to the thumb, so as to wake up the scanner or implement other functions. In this way, if the scanner is worn on the left hand, the button on the right side is correspondingly operated; and if the scanner is worn on the right hand, the button on the left side is correspondingly operated. Therefore, only one side of the button actually functions at the same time. However, both the buttons on both sides of the conventional ring-type scanner are active, which are easily touched by mistake. For example, when the scanner is worn on the left hand, other fingers of the left hand such as the middle finger easily touches the button on the left side by mistake, causing the scanner to be wrongly woken up or perform other operations, so that the energy consumption of the scanner is increased, and the endurance performance of the scanner is reduced.

The following description of the left and right directions is based on the normal viewing angle of a user after the scanner is worn on the finger.

As shown in FIG. 1, the present disclosure provides a method for switching scanner buttons. Buttons are disposed on both left and right sides of a scanner. The buttons may be physical buttons or touch buttons. The switching method includes the following steps.

At S1, a barcode is scanned and barcode data is obtained.

The scanner is provided with a scanning camera. The scanning camera is used to scan the barcode to obtain the barcode data, and then the barcode data is transmitted to a Bluetooth master control of the scanner. The barcode may be a bar code or a two-dimensional code.

At S2, whether the barcode data matches preset button switching barcode data is determined.

The Bluetooth master control analyzes the received barcode data, and determines whether the barcode data matches the preset button switching barcode data. If so, S3 is executed; and if no, other processing corresponding to the barcode data is performed. For example, commodity information is obtained by means of the barcode data.

At S3, in a case that the barcode data matches the button switching barcode data, an active button bit for waking up the scanner is switched from a button at the current side to a button at the other side.

A specific manner of switching the active button bit is that, flag bits corresponding to the buttons on the left and right sides are set. When the active button bit is switched to the button of one side, the flag bit corresponding to the button is configured to be active; and at the same time, the button on the other side is inactive, so as to guarantee that the button on the single side of the scanner to be active at the same time.

Further, after the active button bit is switched, whether the barcode data matching the button switching barcode data is continuously inputted is detected.

If the barcode data matching the button switching barcode data is continuously inputted, the active button bit is switched from the button at the current side to the button at the other side.

Specifically, after the active button bit is switched, the Bluetooth master control detects whether the scanning camera continuously inputs the barcode data matching the button switching barcode data, so as to determine whether the scanner continuously scans the barcode. If the barcode matching the button switching barcode data is continuously scanned after the active button bit is switched, the scanner performs the switching of the active button bit again. The purpose of the step is that, when a button switching barcode is wrongly scanned and after the active button bit is switched, by means of continuously scanning the barcode, the active button bit can be switched back again.

Further, whether the scanner is restarted is detected.

In a case that the scanner is restarted, the active button bit is initialized, and the active button bit is reset as the button corresponding to a default side.

In a case that the scanner is not restarted, the active button bit is maintained to continuously correspond to the button on the current side which is active.

Specifically, the operation of detecting whether the scanner is restarted is performed the whole using phase of the scanner, which may be performed during normal use or dormancy of the scanner, or may be during the switching of the active button bit of the scanner. Restarting means that the scanner is powered on again, which may be restarted normally or re-energized after power failure.

The scanner is initialized to be used by the right hand by default. That is to say, the initialized active button bit is the button corresponding to the upper left side of the scanner.

In some embodiments of the present disclosure, after the active button bit is switched, the button currently corresponding to the active button bit is maintained active before next switching. That is to say, before next switching, the button on the side of the scanner is maintained active on the single side.

Figure 2:
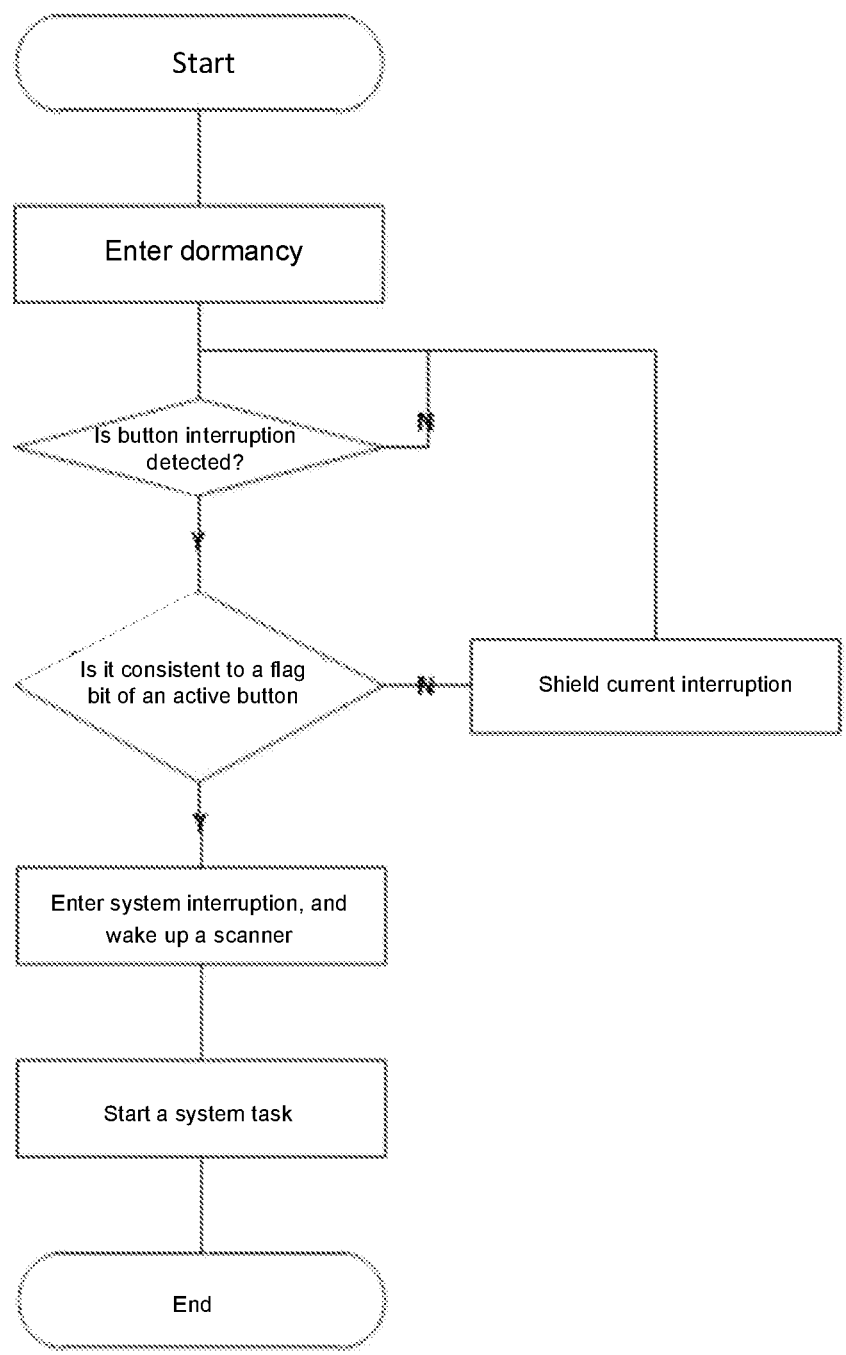
FIG. 2 is a flowchart of a switching method for achieving a button to be active on a single side according to the present disclosure.

In some embodiments of the present disclosure, as shown in FIG. 2, in the switching method of the present disclosure, a method that the active button bit correspondingly wakes up the scanner includes the following operations.

The scanner in dormancy continuously detects whether button interruption occurs.

Under the condition that it is detected that button interruption occurs, whether the interrupted button is a button currently corresponding to the active button bit is determined.

In a case that the interrupted button is the button currently corresponding to the active button bit, the scanner is woken up.

In a case that the interrupted button is not the button currently corresponding to the active button bit, button interruption is shielded, the dormancy of the scanner is maintained, and whether button interruption occurs is continuously detected.

Specifically, during the actual application, before S1 is performed, the scanner is also to be required to be woken up by using the button corresponding to the active button bit by means of the method for achieving the button to be active on the single side.

The present disclosure further provides an apparatus for switching scanner buttons, including a scanning component and a control component.

The scanning component is configured to scan a barcode and obtain barcode data.

The control component is configured to, in a case that the barcode data obtained by the scanning component matches preset button switching barcode data, switch an active button bit for waking up a scanner from a button at the current side to a button at the other side.

Specifically, the scanning component includes a scanning camera and a data transmission assembly. The control component includes a master control unit and a data receiving assembly. In the field of ring-type scanners, the master control unit generally uses a Bluetooth master control chip with low power consumption. The control component is configured to set flag bits that respectively correspond to the buttons on both sides, and configure the flag bit of the button corresponding to the active button bit to be active, so as to achieve the button to be active on the single side. After performing the switching of the active button bit, the control component detects, by means of the scanning component, whether a barcode matching a button switching barcode is continuously scanned, and if so, switches the active button bit again. After the scanner is restarted, the control component controls the active button bit to reset. That is to say, the flag bit of the button of the side corresponding to the active button bit by default is configured to be active. The restarting includes normal restarting and restarting by means of powering on again after sudden power failure.

In addition, when the scanner is woken up, the control component maintains button interruption active during the dormancy of the scanner, and continuously detects whether button interruption occurs, that is, detects whether a user triggers the button. When button interruption occurs, the control component determines whether the interrupted button is a button corresponding to the active button bit, if so, wakes up the scanner, otherwise, shields button interruption, and maintains the dormancy of the scanner and the continuous detection of button interruption.

The present disclosure further provides a storage medium. The storage medium stores a computer program. When the computer program is executed by a processor, the above scanner button switching method is implemented.

The present disclosure further provides a scanner. Buttons are disposed on both left and right sides of the scanner. The scanner further includes a memory and a processor.

The memory is configured to store a computer program.

The processor is configured to execute the computer program in the memory, so as to implement the above scanner button switching method.

The memory and the processor are directly or indirectly electrically connected to each other, so as to implement the transmission or interaction of data. For example, these elements may be electrically connected to each other by means of one or more communication buses or signal lines.

The memory may be, but is not limited to, a Random Access Memory (RAM), a Read Only Memory (ROM), a Programmable Read-Only Memory (PROM), an Erasable Programmable Read-Only Memory (EPROM), an Electrical Erasable Programmable Read-Only Memory (EEPROM), or the like.

The processor may be an integrated circuit chip and has a signal processing capacity. The processor may be a general processor, such as a Central Processing Unit (CPU), a Network Processor (NP) or a microprocessor, or may be a Digital Signal Processor (DSP), an Application Specific Integrated Circuit (ASIC), a Field-Programmable Gate Array (FPGA) or other programmable logic devices, discrete gate or transistor logic devices, and discrete hardware components. The processor may further be any conventional processor.

Although the present disclosure is described herein with reference to specific implementations, it should be understood that these embodiments are merely examples of the principles and applications of the present disclosure. Therefore, it should be understood that many modifications can be made to the exemplary embodiments. In addition, other arrangements can be devised, so long as the arrangements do not depart from the spirit and scope of the present disclosure as defined by the appended claims. It should be understood that, different dependent claims and features described herein can be combined in a manner different from that described in the original claims. It is also understandable that, the features described in conjunction with the separate embodiments may be used in other described embodiments.

What is claimed is:

1. A method for switching scanner buttons, wherein buttons are disposed on both left and right sides of a scanner; and the method comprises:
    scanning a barcode and obtaining barcode data;
    determining whether the barcode data matches preset button switching barcode data; and
    in a case that the barcode data matches the button switching barcode data, switching an active button bit for waking up the scanner from a button at the current side to a button at the other side.

2. The method for switching the scanner buttons as claimed in claim 1, wherein switching the active button bit for waking up the scanner from the button at the current side to the button at the other side comprises:
    setting flag bits that respectively correspond to the buttons on the both sides, and configuring the flag bit of the button corresponding to the active button bit to be active.

3. The method for switching the scanner buttons as claimed in claim 1, further comprising:
    after the active button bit is switched, detecting whether the barcode data matching the button switching barcode data is continuously inputted; and
    in a case that the barcode data matching the button switching barcode data is continuously inputted, switching the active button bit from the button at the current side to the button at the other side.

4. The method for switching the scanner buttons as claimed in claim 1, further comprising:
    detecting whether the scanner is restarted;
    in a case that the scanner is restarted, initializing the active button bit, and resetting the active button bit as the button corresponding to a default side; and
    in a case that the scanner is not restarted, maintaining the active button bit to continuously correspond to the button on the current side which is active.

5. The method for switching the scanner buttons as claimed in claim 4, wherein the initialized active button bit corresponds to the button on the left side under the condition that the scanner is worn on the right hand.

6. The method for switching the scanner buttons as claimed in claim 1, further comprising:
    after the active button bit is switched, maintaining the button currently corresponding to the active button bit active before next switching.

7. The method for switching the scanner buttons as claimed in claim 1, wherein waking up the scanner comprises:
    the scanner in dormancy continuously detecting whether button interruption occurs;
    under the condition that it is detected that button interruption occurs, determining whether the interrupted button is a button currently corresponding to the active button bit;
    in a case that the interrupted button is the button currently corresponding to the active button bit, waking up the scanner; and
    in a case that the interrupted button is not the button currently corresponding to the active button bit, shielding button interruption, maintaining the dormancy of the scanner, and continuously detecting whether button interruption occurs.

8. An apparatus for switching scanner buttons, comprising:
    a scanning component, configured to scan a barcode and obtain barcode data; and
    a control component, configured to, in a case that the barcode data obtained by the scanning component matches preset button switching barcode data, switch an active button bit for waking up a scanner from a button at the current side to a button at the other side.

9. A storage medium, having a computer program stored thereon, wherein, when the computer program is executed by a processor, the scanner button switching method as claimed in claim 1 is implemented.

10. A scanner, comprising:
    a memory, configured to store a computer program; and a processor, configured to execute the computer program in the memory, so as to implement the scanner button switching method as claimed in claim 1.

11. The storage medium as claimed in claim 9, wherein switching the active button bit for waking up the scanner from the button at the current side to the button at the other side comprises:

setting flag bits that respectively correspond to the buttons on the both sides, and configuring the flag bit of the button corresponding to the active button bit to be active.

12. The storage medium as claimed in claim 9, further comprising:

after the active button bit is switched, detecting whether the barcode data matching the button switching barcode data is continuously inputted; and in a case that the barcode data matching the button switching barcode data is continuously inputted, switching the active button bit from the button at the current side to the button at the other side.

13. The storage medium as claimed in claim 9, further comprising:

detecting whether the scanner is restarted;

in a case that the scanner is restarted, initializing the active button bit, and resetting the active button bit as the button corresponding to a default side; and in a case that the scanner is not restarted, maintaining the active button bit to continuously correspond to the button on the current side which is active.

14. The storage medium as claimed in claim 13, wherein the initialized active button bit corresponds to the button on the left side under the condition that the scanner is worn on the right hand.

15. The storage medium as claimed in claim 9, further comprising:

after the active button bit is switched, maintaining the button currently corresponding to the active button bit active before next switching.

16. The storage medium as claimed in claim 9, wherein waking up the scanner comprises:

the scanner in dormancy continuously detecting whether button interruption occurs;

under the condition that it is detected that button interruption occurs, determining whether the interrupted button is a button currently corresponding to the active button bit;

in a case that the interrupted button is the button currently corresponding to the active button bit, waking up the scanner; and in a case that the interrupted button is not the button currently corresponding to the active button bit, shielding button interruption, maintaining the dormancy of the scanner, and continuously detecting whether button interruption occurs.

17. The scanner as claimed in claim 10, wherein switching the active button bit for waking up the scanner from the button at the current side to the button at the other side comprises:

setting flag bits that respectively correspond to the buttons on the both sides, and configuring the flag bit of the button corresponding to the active button bit to be active.

18. The scanner as claimed in claim 10, further comprising:

after the active button bit is switched, detecting whether the barcode data matching the button switching barcode data is continuously inputted; and in a case that the barcode data matching the button switching barcode data is continuously inputted, switching the active button bit from the button at the current side to the button at the other side.

19. The scanner as claimed in claim 10, further comprising:

detecting whether the scanner is restarted;

in a case that the scanner is restarted, initializing the active button bit, and resetting the active button bit as the button corresponding to a default side; and in a case that the scanner is not restarted, maintaining the active button bit to continuously correspond to the button on the current side which is active.

20. The scanner as claimed in claim 19, wherein the initialized active button bit corresponds to the button on the left side under the condition that the scanner is worn on the right hand.

\* \* \* \* \*

UNITED STATES PATENT AND TRADEMARK OFFICE
CERTIFICATE OF CORRECTION

| | |
|---|---|
| PATENT NO. | : 12,026,573 B2 |
| APPLICATION NO. | : 18/004297 |
| DATED | : July 2, 2024 |
| INVENTOR(S) | : Kangzhuang Du et al. |

It is certified that error appears in the above-identified patent and that said Letters Patent is hereby corrected as shown below:

On the Title Page

In item (73), in Assignee, delete "GREE ELECTRIC APPLIANCES (WUHAN) CO., LTD, Hubei (CN); GREE ELECTRIC APPLIANCES, INC. OF ZHUHAI, Guangdong (CN)" and insert therefor --GREE ELECTRIC APPLIANCES (WUHAN) CO., LTD, Hubei (CN); GREE ELECTRIC APPLIANCES, INC. OF ZHUHAI, Guangdong (CN), ZHUHAI LEAYUN TECHNOLOGY CO., LTD, Guangdong (CN)--.

Signed and Sealed this
Third Day of December, 2024

Katherine Kelly Vidal
*Director of the United States Patent and Trademark Office*